(12) United States Patent
Roth et al.

(10) Patent No.: US 6,823,448 B2
(45) Date of Patent: Nov. 23, 2004

(54) EXCEPTION HANDLING USING AN EXCEPTION PIPELINE IN A PIPELINED PROCESSOR

(75) Inventors: Charles P. Roth, Austin, TX (US); Ravi P. Singh, Austin, TX (US); Gregory A. Overkamp, Austin, TX (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 639 days.

(21) Appl. No.: 09/738,081

(22) Filed: Dec. 15, 2000

(65) Prior Publication Data

US 2002/0078334 A1 Jun. 20, 2002

(51) Int. Cl.⁷ .................................................. G06F 9/00
(52) U.S. Cl. ........................................................ 712/244
(58) Field of Search ......................................... 712/244

(56) References Cited

U.S. PATENT DOCUMENTS

| | | | | |
|---|---|---|---|---|
| 5,297,263 A | * | 3/1994 | Ohtsuka et al. | 712/244 |
| 5,428,755 A | * | 6/1995 | Imai et al. | 712/226 |
| 5,603,047 A | * | 2/1997 | Caulk, Jr. | 712/23 |
| 5,889,982 A | * | 3/1999 | Rodgers et al. | 712/229 |
| 6,041,399 A | * | 3/2000 | Terada et al. | 712/24 |
| 6,209,086 B1 | * | 3/2001 | Chi et al. | 712/244 |

FOREIGN PATENT DOCUMENTS

EP     0 690 372 A1     1/1996

OTHER PUBLICATIONS

Dale, et al., "Pipeline Processor Exception Control Mechanism", *IBM Technical Disclosure Bulletin*, vol. 24, No. 11A, Apr. 1982, p. 5530.
"Closest to Completion Logic to Store Finished Program Exception Codes", *IBM Technical Disclosure Bulletin*, vo. 36, No. 4, Apr. 1993, pp. 87–89.
Garcia, et al., "Storage Access–Exception Detection for Pipelined Execution Units", *IBM Technical Disclosure Bulletin*, vol. 25, No. 12, May, 1983, pp. 6711–6712.

* cited by examiner

*Primary Examiner*—Eddie Chan
*Assistant Examiner*—Shane Gerstl
(74) *Attorney, Agent, or Firm*—Fish & Richardson P.C.

(57) ABSTRACT

A programmable processor includes a execution pipeline and an exception pipeline. The execution pipeline may be a multi-stage execution pipeline that processes instructions. The exception pipeline may be a multi-stage exception pipeline that propagates exceptions resulting from the execution of the instructions. The execution and exception pipelines may have the same number of stages and may operate on the same clock cycles. When an instruction passes from a stage of the execution pipeline to a later stage of the execution pipeline, an exception may similarly pass from a corresponding stage of the exception pipeline to a corresponding later stage of the exception pipeline.

25 Claims, 4 Drawing Sheets

EXCEPTION HANDLING USING AN EXCEPTION PIPELINE IN A PIPELINED PROCESSOR

BACKGROUND

This invention relates to exception handling in a processor.

A programmable microprocessor, such as a digital signal processor, typically includes exception handling hardware for dealing with errors that may be encountered while processing instructions. For example, the processor may encounter illegal instructions (unsupported opcodes), misaligned instructions, instructions that access protected areas of memory, illegal memory addresses, bus errors and the like.

In the event such an error is detected, the exception handler hardware typically invokes a corresponding software routine, often referred to as an error handler, for responding to the error condition.

DESCRIPTION

Figure 1:
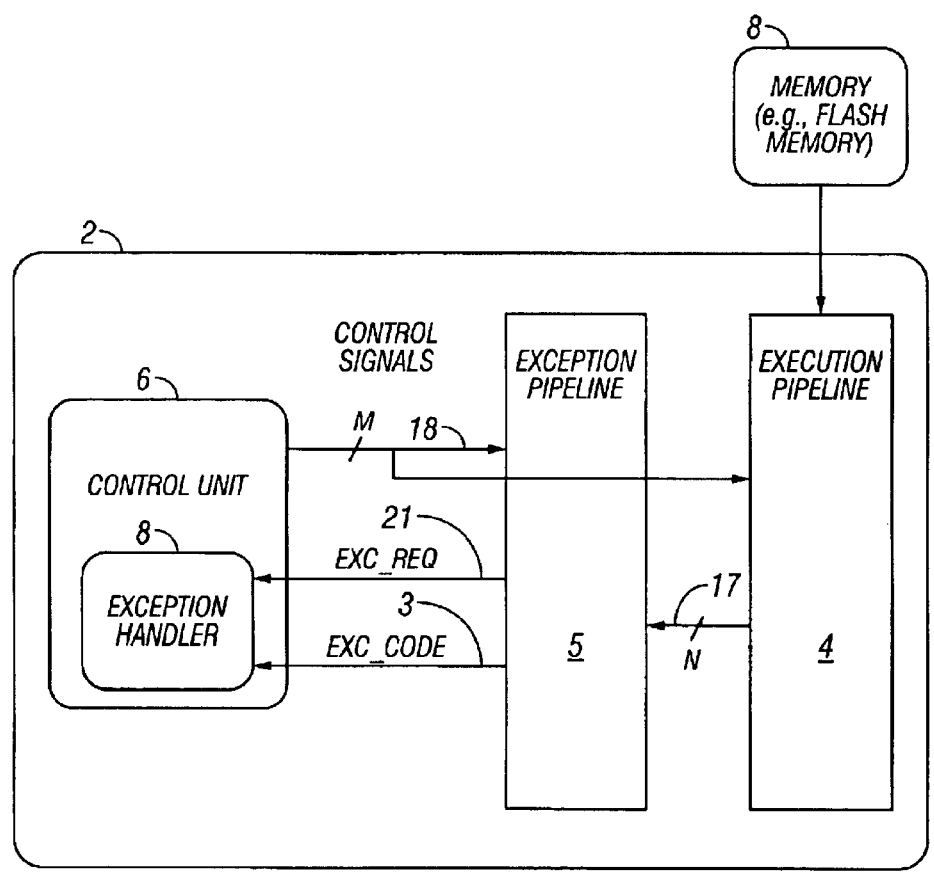
FIG. 1 is a block diagram illustrating an example of a programmable processor configured according to an embodiment of the invention.

FIG. 1 is a block diagram illustrating an example of a programmable processor adapted to handle exceptions according to an embodiment of the invention. Processor 2 may include execution pipeline 4, exception pipeline 5 and control unit 6.

Execution pipeline 4 may have a number of pipeline stages for concurrently processing more than one instruction. Instructions may be loaded into a first stage of execution pipeline 4 and processed through subsequent stages. Data may pass between the stages in pipelines 4 during a cycle of the system. The results of an instruction may emerge at the end of the pipelines 4 in rapid succession.

Control unit 6 may control the flow of instructions and/or data through execution pipeline 4 according to a system clock. For example, during the processing of an instruction, control unit 6 may direct the various components of pipeline 4 to decode an instruction and correctly perform the corresponding operation including, for example, writing the results back to memory.

The various stages of execution pipeline 4 may, in the event of an error condition, generate one or more exception signals 17, which may be in the form of an exception code representative of a particular error condition. Exception pipeline 5 may have a number of pipeline stages for receiving the exceptions from execution pipeline 4 and propagating the exceptions in sync with the instructions responsible for causing the error conditions. As described in detail below, exception pipeline 5 is "interlocked" with execution pipeline 4 to ensure that the exceptions flowing through exception pipeline 5 remain synchronized with the instructions flowing through execution pipeline 4. For example, if a stall condition arises in execution pipeline 4, exception pipeline 5 may stall for an equal number of cycles.

Figure 2:
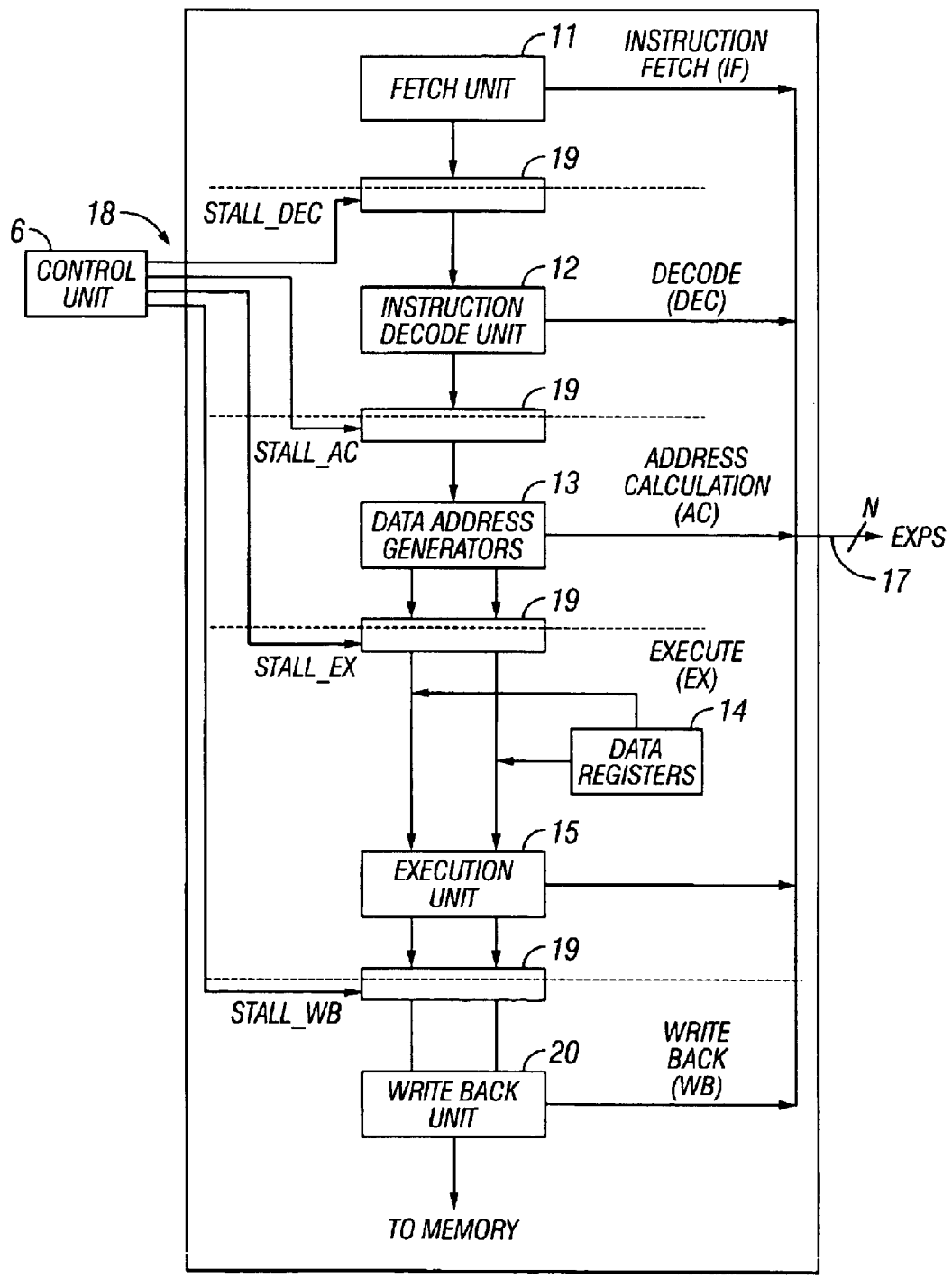
FIG. 2 is a block diagram illustrating an example execution pipeline of the programmable processor.

FIG. 2 is a block diagram illustrating an execution pipeline in a programmable processor according to an embodiment of the invention. Control unit 6 may assert control signals 18 to control the flow of instructions and data through execution pipeline 4.

Pipeline 4, for example, may have five stages: instruction fetch (IF), instruction decode (DEC), address calculation (AC), execute (EX) and write back (WB). Instructions may be fetched from a memory device such as, for example, main memory 8 or from an instruction cache during the first stage (IF) by fetch unit 11 and decoded during the second stage (DEC) by instruction decode unit 12. At the next clock cycle, the results are passed to the third stage (AC), where data address generators 13 may calculate any memory addresses to perform the operation.

During the execution stage (EX), execution unit 15, may perform one or more operations specified by the instruction such as, for example, adding or multiplying two numbers. Execution unit 15 may contain specialized hardware for performing the operations including, for example, one or more arithmetic logic units (ALU's), floating-point units (FPU) and barrel shifters. A variety of data may be applied to execution unit 15 such as the addresses generated by data address generators 13, data retrieved from memory or data retrieved from data registers 14. During the final stage (WB), write back unit 20 may write any results back to data memory or to data registers 14.

The stages of pipeline 4 include storage circuits, such as pipeline registers 19, for storing any results of the current stage. Stage registers 19 typically latch the results according to the system clock. Stage registers 19 receive the control signals 18, including one or more stall signals, which control whether or not stage registers 19 latch the results from the previous stage. In this manner, control unit 6 may synchronously stall one or more stages of pipeline 4. As described in detail below, exception pipeline 5 (FIG. 1) also receives control signals 18 and synchronously stalls with execution pipeline 4.

The various stages of execution pipeline 4 may generate one or more exception signals (EXPS) indicating an error condition has been detected within the corresponding stage. For example, fetch unit 11 may assert one of the exception signals 17 when a misaligned instruction is encountered. Decode unit 12 may assert an exception signal 17 when an unsupported (illegal) instruction opcode is decoded. Data address generators 13 may assert an exception signal 17 when an illegal memory address is computed. Execution unit 15 may assert an exception signal 17 when an operation results in an error condition, such as an overflow condition. Write back unit 20 may assert an exception signal 17 when an instruction attempts to write results to a protected area of memory. These errors are listed for exemplary purposes only and represent only a subset of errors that may arise during the execution of an instruction.

Figure 3:
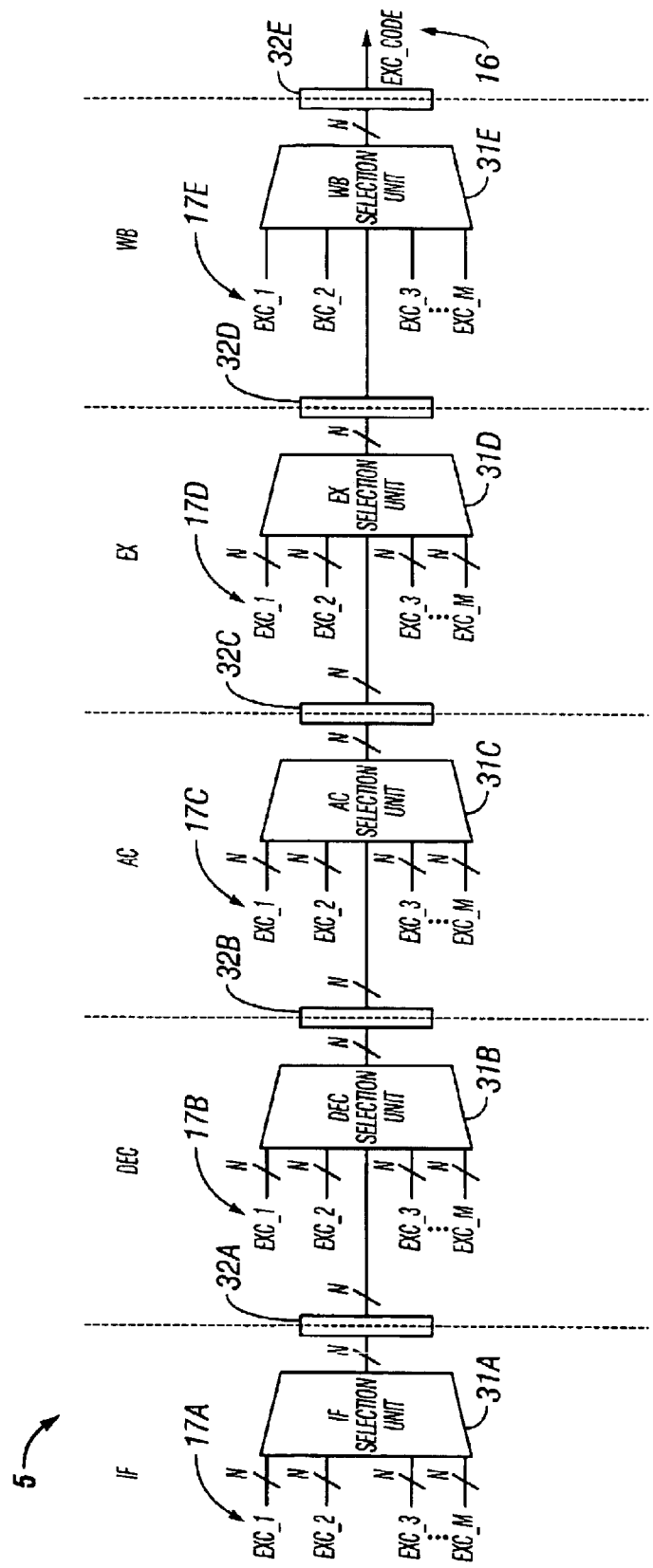
FIG. 3 is circuit diagram of an exception pipeline according to an embodiment of the invention.

FIG. 3 is a block diagram illustrating an example exception pipeline 5 having a plurality of stages. Exception pipeline 5 may have, for example, an instruction fetch (IF) stage, a decode (DEC) stage, an address calculation (AC) stage, an execute (EX) stage and a write back (WB) stage. Each stage of exception pipeline 5 may receive one or more exceptions 17 from a corresponding stage of execution pipeline 4. For example, the IF stage of exception pipeline 5 may receive one or more of M exceptions 17A. Each exception 17 may be represented by an N bit exception code.

Therefore, pipeline registers 32 may be capable of storing N bits in parallel.

Each stage of exception pipeline 5 includes an exception selection unit 31 for selecting a highest priority exception to be passed to the subsequent stage. For example, instruction fetch selection unit 31A selects one of the M exceptions that may arise in the IF stage of exception pipeline 5. The selected IF exception is stored within stage register 32A upon the next clock cycle.

Depending on the priority of the various exceptions, decode selection unit 31B selects either: (1) one of the M exceptions 17B that may arise during the decode stage of execution pipeline 4, or (2) the exception stored within stage register 32A propagated from the IF stage of exception pipeline 5. Decode selection unit 31B stores the selected exception in pipeline stage register 32B.

In this manner, exceptions propagate through the various stages of exception pipeline 5 in sync with the various instructions propagating through execution pipeline 4. As an instruction is committed during the write back stage of execution pipeline 4, a corresponding exception may emerge from exception pipeline 5 on the exc_code output, for use by control unit 6 and exception handler 8 invoking a corresponding error handling software routine. In one embodiment, the process of servicing an exception begins several stages before the exception emerges from the WB stage and the appropriate service routine is invoked.

Figure 4:
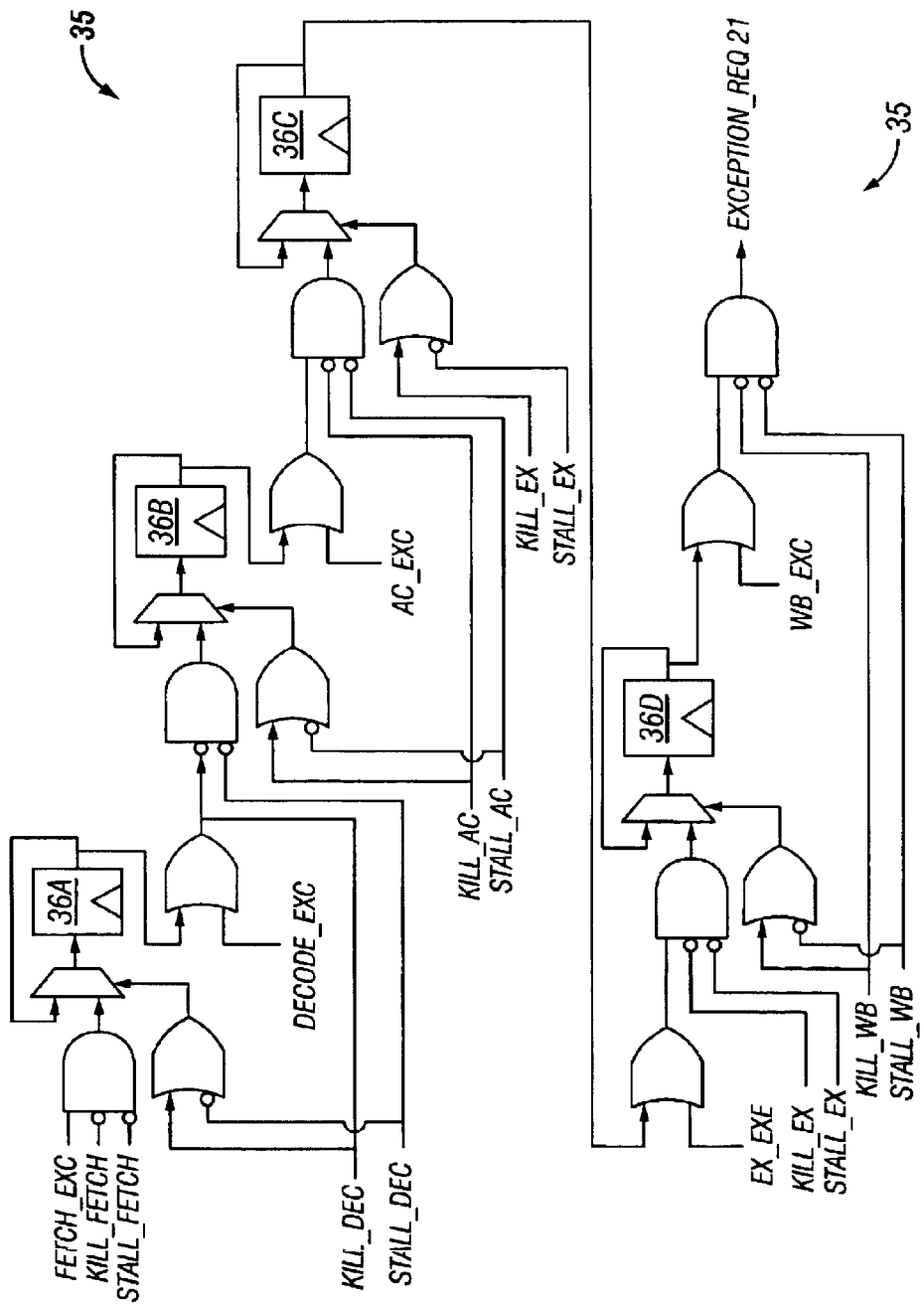
FIG. 4 is another circuit diagram of an exception pipeline according the an embodiment of the invention

FIG. 4 is a block diagram illustrating a circuit 35 of exception pipeline 5 for controlling the flow of exceptions through the various stages illustrated in FIG. 3. As described in detail below, circuit 35 propagates one or more exception requests through a series of flip flops 36; the exception requests correspond to the exception codes propagating within exception pipeline 5 of FIG. 3.

The exception requests are qualified as they propagate through circuit 35 with the same control signals 18 that control the flow of instructions through execution pipeline 4. For example, a first fetch exception signal is qualified with two signals: (1) a "kill" signal, indicating whether a corresponding instruction will not be committed in the WB stage due to a change in instruction flow, and (2) a "stall" signal, indicating the corresponding instruction has stalled in execution pipeline 4. When these conditions do not exist, the fetch exception request signal is latched by flip-flop 36 A. In the event of a stall condition, however, the output of flip-flop 36 A is fed back and selected by a multiplexer to be latched at the following clock cycle. In this manner, the exception requests are interlocked with the instruction flow through execution pipeline 4.

Similarly, an exception request generated at the decode stage is ORed with an output of flip-flop 36A to produce a combined decode exception request, which is similarly qualified with the kill and stall condition signals. In this manner, exception request signals may enter circuit 35 at any stage and propagate to flip-flop 36D unless the corresponding instruction is killed within the execution pipeline 4. In this event, the exception request is overwritten and removed from circuit 35.

The output of flip-flop 36D is again qualified with not stalled and not killed for the write back stage. The output of circuit 35 is an exception$_{13}$ req signal 21 that is received by exception handler 8. In response, exception handler 8 invokes a corresponding exception handling software routine based upon the current exception code 16 supplied by exception pipeline 5 of FIG. 3.

Although not illustrated in FIG. 4, the input exception signals are pre-qualified with an instruction valid signal to ensure that the exception is associated with a "valid" instruction, i.e., an instruction that is supported by the instruction set of processor 2. Unlike the other exception signals, however, the fetch exception signal is not qualified with a valid instruction signal. This ensures that exceptions arising during the IF stage are correctly serviced regardless of whether valid instructions are fetched. The corresponding instruction as it propagates through execution pipeline 4, however, is marked as an invalid instruction.

Various embodiments of the invention have been described. For example, a processor having an exception pipeline for propagating exception requests has been described. The processor may be implemented in a variety of systems including general purpose computing systems, digital processing systems, laptop computers, personal digital assistants (PDA's) and cellular phones. In such a system, the processor may be coupled to a memory device, such as a Flash memory device or a static random access memory (SRAM), that stores an operating system and other software applications. These and other embodiments are within the scope of the following claims.

What is claimed is:

1. A method comprising:

processing an instruction in an execution pipeline of a programmable processor; and propagating an exception of the instruction through an exception pipeline of the processor;

wherein said propagating the exception through the exception pipeline comprises selecting one of a plurality of exceptions at an intermediate stage of the exception pipeline based on priority information associated with the exceptions, the plurality of exceptions including a first exception obtained from a previous stage and a second exception obtained at the intermediate stage, and propagating a selected exception to a subsequent stage of the exception pipeline.

2. The method of claim 1, wherein processing the instruction in the execution pipeline comprises propagating the instruction through N stages of the execution pipeline, and wherein said propagating the exception of the instruction through the exception pipeline comprises propagating the exception of the instruction through N stages of the exception pipeline.

3. The method of claim 1, further comprising receiving the propagated exception from the execution pipeline and storing the propagated exception within the exception pipeline.

4. The method of claim 3, wherein receiving the propagated exception comprises receiving an exception code from one of a plurality of stages of the execution pipeline, and further wherein storing the propagated exception includes storing the exception code within a corresponding stage of the exception pipeline.

5. The method of claim 1, wherein said propagating the exception through the exception pipeline further comprises propagating an exception request bit in the exception pipeline, wherein the exception request bit represents an error condition for an instruction within a corresponding stage of the execution pipeline.

6. The method of claim 1, further comprising stalling the exception pipeline when the execution pipeline is stalled.

7. The method of claim 1, further comprising clearing the propagated exception within the exception pipeline when a corresponding instruction within execution pipeline will not complete execution.

8. The method of claim 1, further comprising servicing the propagated exception when the propagated exception has propagated through a last stage of the exception pipeline.

9. The method of claim 1, further comprising qualifying the propagated exception at stages of the exception pipeline to ensure the corresponding instruction has not been terminated.

10. The method of claim 1, further comprising qualifying the propagated exception at stages of the exception pipeline, except an instruction fetch stage, to ensure the corresponding instruction is valid.

11. An apparatus comprising:
   an execution pipeline having a plurality of stages to execute one or more instructions concurrently; and
   an exception pipeline having a plurality of stages to propagate exceptions resulting from the execution of the instructions;
   wherein the stages of the exception pipeline include at least one intermediate stage comprising an exception selection unit operable to select a highest priority exception from among a first exception obtained from a previous stage and a second exception obtained at the intermediate stage to be passed to a subsequent stage of the exception pipeline.

12. The apparatus of claim 11, wherein the execution pipeline and the exception pipeline each have N stages.

13. The apparatus of claim 11, wherein the stages of the exception pipeline include pipeline registers to store exception codes.

14. The apparatus of claim 11, wherein the stages of the exception pipeline and the execution pipeline are controlled by one or more stall signals.

15. The apparatus of claim 11, wherein the exception pipeline includes a plurality of storage circuits to propagate an exception request bit.

16. The apparatus of claim 15, wherein each stage of the exception pipline receives a kill signal to reset the exception request bit.

17. The apparatus of claim 15, further comprising an exception handler receiving the exception request bit from a last stage of the exception pipeline.

18. The apparatus of claim 15, wherein the stages of the exception pipeline include logic to qualify the exception request bit to ensure the instruction is a valid instruction and has not been terminated.

19. The apparatus of claim 11, wherein each of the stages of the exception pipeline includes selection logic to select one of a plurality of exceptions based on priority information associated with the exceptions.

20. A system comprising:
   a Flash memory device; and
   a processor coupled to the Flash memory device, wherein the processor includes an execution pipeline having a plurality of stages to execute one or more instructions concurrently, and an exception pipeline having a plurality of stages to propagate exceptions resulting from the execution of the instructions,
   wherein the stages of the exception pipeline include at least one intermediate stage comprising an exception selection unit operable to select a highest priority exception from among a first exception obtained from a previous stage and a second exception obtained at the intermediate stage to be passed to a subsequent stage of the exception pipeline.

21. The system of claim 20, wherein the execution pipeline and the exception pipeline each have N stages.

22. The system of claim 20, wherein the stages of the exception pipeline include pipeline registers to store exception codes.

23. The system of claim 20, wherein the stages of the exception pipeline and the execution pipeline are synchronously controlled by one or more stall signals.

24. The system of claim 20, wherein the exception pipeline includes a plurality of storage circuits to propagate an exception request bit.

25. The system of claim 24, wherein the processor further comprises an exception handler receiving the exception request bit from a last stage of the exception pipeline.

* * * * *